US005184153A

United States Patent [19]

Daniels et al.

[11] Patent Number: 5,184,153

[45] Date of Patent: Feb. 2, 1993

[54] COMPACT LASER PRINTER WITH LIGHT TIGHT COMPARTMENT ACCESS

[75] Inventors: Steven D. Daniels, Churchville; Mark D. Bedzyk, Rochester; Roger S. Brahm, Canandaigua; Anthony M. Olexy, Honeoye Falls, all of N.Y.

[73] Assignee: Eastman Kodak Company, Rochester, N.Y.

[21] Appl. No.: 637,429

[22] Filed: Jan. 4, 1991

[51] Int. Cl.[5] .............................................. H04N 1/21

[52] U.S. Cl. .................................... 346/108; 346/134

[58] Field of Search .................. 346/139 R, 108, 134; 355/308, 321, 72

[56] References Cited

U.S. PATENT DOCUMENTS

| | | | |
|---|---|---|---|
| 3,150,263 | 9/1964 | Catlin | 250/66 |
| 4,354,336 | 10/1982 | Azzaroni | 53/985 |
| 4,417,260 | 11/1983 | Kawai | 346/160 |
| 4,706,099 | 11/1987 | Suzuki | 346/160 |
| 4,712,118 | 12/1987 | Seto et al. | 346/108 |
| 4,774,533 | 9/1988 | Müller | 346/160 |
| 4,792,816 | 12/1988 | Kennedy, Jr. | 346/108 |
| 4,814,792 | 3/1989 | Yamanobe et al. | 346/108 |
| 4,814,793 | 3/1989 | Hamada et al. | 346/108 |
| 4,884,083 | 11/1989 | Loce et al. | 346/108 |
| 4,975,580 | 12/1990 | Ohgoda et al. | 250/327.2 |
| 5,044,621 | 9/1991 | Sachs et al. | 271/11 |
| 5,068,685 | 11/1991 | Hisada et al. | 355/32 |

FOREIGN PATENT DOCUMENTS

| | | |
|---|---|---|
| 212830 | 8/1990 | Japan . |
| 212831 | 8/1990 | Japan . |
| 88/06749 | 9/1988 | PCT Int'l Appl. . |

*Primary Examiner*—Mark J. Reinhart
*Attorney, Agent, or Firm*—J. Allen Jones

[57] ABSTRACT

A laser printer characterized by compact construction, and by ease of servicing and film loading. A light-tight upper compartment contains a printer station which includes a film moving roller at one side of the apparatus, and toward which film is fed sideways from a registration station. The printer includes a laser and optics located above the alignment station. Various sizes of film are stored in respective magazines carried by stacked drawers located below the alignment station, and a transport mechanism located in front of the magazine withdraws film from the drawers and carries it upwardly and moves it into the alignment station by movement of the film toward the rear of the apparatus. Film moving from the printer station moves downwardly along one side of the machine into a chute and then to a roller device which can direct the exposed film either into a storage magazine under the fresh film magazines, or to an adjacent processor located to the side of the printer. Operating electronics are in a separate compartment below the light-tight compartment and are shielded to protect the upper compartment components from electronic emissions. A blower exhausts heat from the lower compartment.

7 Claims, 4 Drawing Sheets

COMPACT LASER PRINTER WITH LIGHT TIGHT COMPARTMENT ACCESS

CROSS REFERENCE TO RELATED APPLICATIONS

Two copending, commonly-assigned applications disclose sheet registration mechanisms useful in the apparatus described and claimed herein. These are U.S. Ser. No. 537,845, filed in the name of S. D. Daniels, Jun. 12, 1990, and U.S. Ser. No. 576,992, filed in the names of Bedzyk and Brahm, on Apr. 30, 1990. Copending, commonly-assigned application Ser. No. 458,699, filed in the name of Sachs et al, on Nov. 16, 1989, now U.S. Pat. No. 5,044,621 discloses a sheet film transport device. Copending, commonly-assigned U.S. application Ser. No. 578,162, filed in the name of Noethen on Sep. 6, 1990, discloses laser scanner apparatus. Commonly-owned International Publication WO 88/06749, published Sep. 7, 1988, PCT/DE88/00089, Baumann et al, discloses sheet film handling apparatus useful in the present invention.

BACKGROUND OF THE INVENTION

The invention relates to a laser printer for x-ray films having a unique configuration and arrangement of parts having compactness attributes as well as particular ease of servicing, permitting all user service and practically all supplier service to be carried out from the front of the machine and allowing film magazines to be loaded in roomlight while the magazines are supported by the machine.

Laser printers are described in a number of patents. The most pertinent appear to be the following:

U.S. Pat. No. 4,417,260, issued Nov. 22, 1983, discloses what might be called a "straight through" printer in which the recording sheets are brought in one at a time from one side of the enclosure for the printer, and after exposure, pass out of the opposite side. Vibration isolation is provided by mounting the light source, light deflecting means and sub-scanning means on a single inner frame which is mounted by a vibration isolator on an outer frame on which the feeding and discharging means are mounted.

U.S. Pat. No. 4,712,118, issued Dec. 8, 1987, discloses a xerographic printer in which a modulated laser beam is reflected from a polygon through a lens system to a photosensitive roll, which then transfers the image to a receiver.

U.S. Pat. No. 4,774,533, issued Sep. 27, 1988, discloses a laser beam printer in which the housing of the processing device is below the remainder of the apparatus and is supported in a vibration-free manner. Dispensers for unexposed film of various sizes are positioned one above another below a cassette loading and unloading station in a light-tight enclosure.

International Publication WO 88/0679, published Sep. 7, 1988, and referred to at the beginning of this specification, discloses stacked film containers and transport mechanism, similar to that disclosed herein, for carrying film to a cassette loading location.

The prior art does not disclose laser printers with the unique organization of parts according to the present invention, in accordance with which compactness is achieved, all user service and practically all supplier service being carried out from the front of the machine without the necessity for moving it from its usual location. The prior art also does not teach the use of a printer having a film magazine that can be loaded with film in a roomlight environment while the magazine is supported in the printer.

SUMMARY OF THE INVENTION

It is an object of the invention to provide a laser printer in which a unique organization of the parts provides compactness and particular ease of servicing, substantially all servicing being carried out from the front of the machine. Another object is to provide a printer which has a film magazine that can be loaded while supported by the printer. The objects are achieved by providing, at an upper location, a registration station which positions a sensitive sheet for movement to a rotating drum type exposure station in a sidewise direction with reference to the front of the machine. The axis of rotation of the drum extends in a front to rear direction. Storage means for sheets are located below the registration station and means are provided for withdrawing sheets toward the front of the printer from the storage means and feeding them to the registration station by sheet movement from the front toward the rear of the printer. Exposed film is fed from the exposure station in a downward direction along a lateral side of the printer for passage either into an exposed sheet receiver located below the sheet storage means, or out of the printer, whence it may pass directly to an adjacent processor or other treatment apparatus. In a preferred embodiment, the sheet storage means comprises a magazine that is supported so that it can be loaded with sheets in roomlight while the magazine is supported by the printer.

The above-described parts are located in an upper compartment with a front opening door furnishing access to them. Below the light tight enclosure is a separate, lower compartment for the operating electronics. The lower compartment provides insulation of the upper compartment from electronic emissions. The lower compartment has a separate access door so that it can be opened for servicing the parts therein without disturbing the light tightness of the upper enclosure.

The light tight enclosure ordinarily needs to be opened by the operator only to load fresh film into the magazine and remove exposed film that has been stored in the exposed sheet receptacle, all of which parts are accessible through the front opening door to the light-tight upper compartment. On rare occasions, the operator may need to open the door to the upper compartment to clear a film jam. The lower compartment containing the operating electronics will ordinarily require access only by a trained service person, who will find most of the parts accessible through the front opening door to the lower compartment. By locating the electronic parts on a sliding shelf, they may be readily slid out for service.

The invention and its objects will be readily understood by reference to the detailed description of the invention presented below, taken in conjunction with the appended drawings.

BRIEF DESCRIPTION OF THE DRAWINGS

In the accompanying drawings.

DETAILED DESCRIPTION OF THE INVENTION

Figure 1:
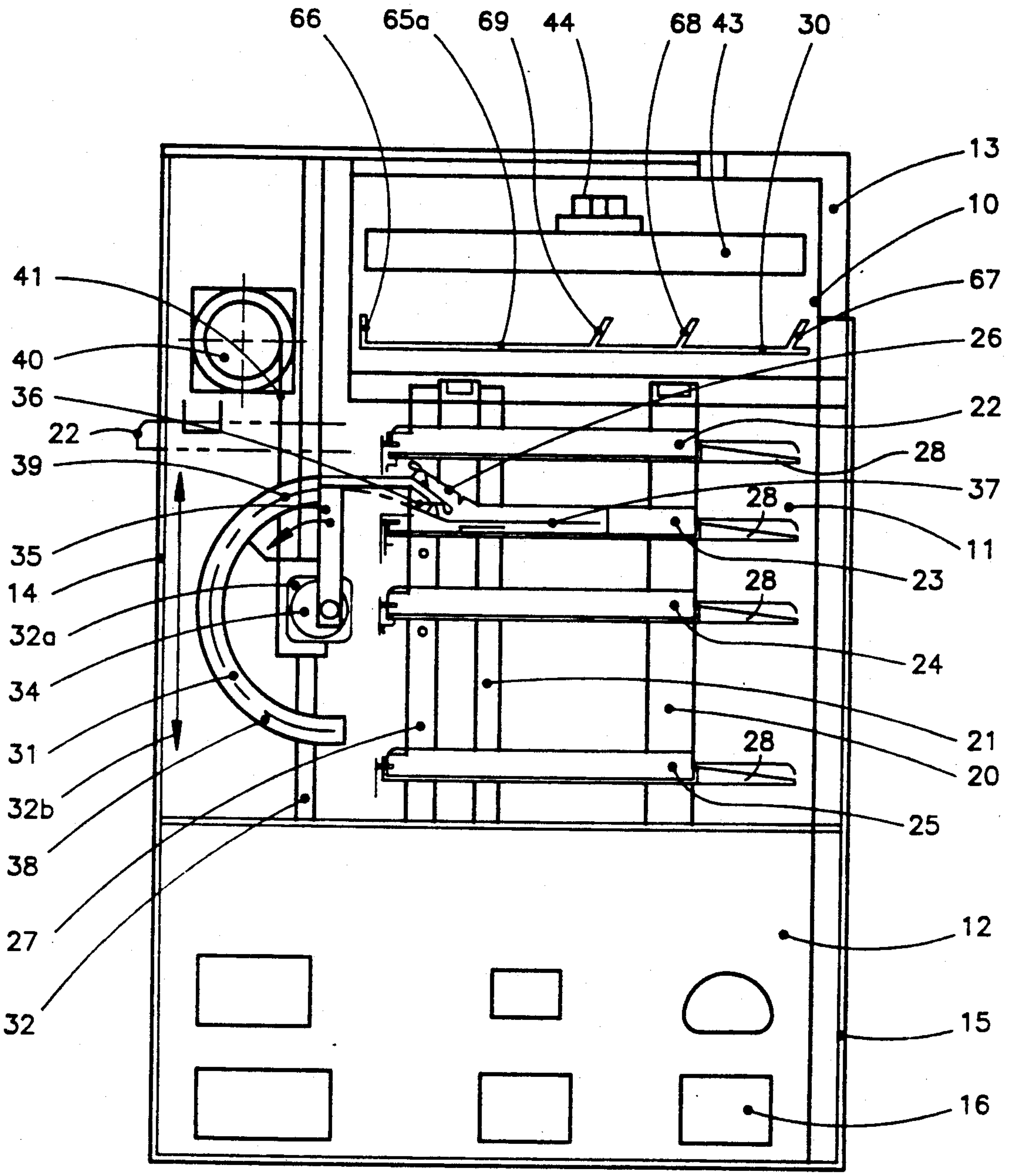
FIG. 1 is a side view of the interior of the printer, schematically showing the general organization of the parts.

In a preferred embodiment of the invention, referring now to FIG. 1, the printer is shown at 10 with an upper compartment 11 and a lower compartment 12. The upper compartment is surrounded by walls 13 at both sides and at the rear. The side walls extend from the rear wall toward the front of the apparatus. At the front a door 14 provides a light tight closure for the upper compartment. The walls 15 of the lower compartment are of material providing shielding of the upper compartment from electronic operating components for the printer, including a blower for exhausting heat from the lower compartment, as indicated generally at 16.

Within upper compartment 10 are two pairs of upright supports 20 and 21 which comprise part of the fixed, supporting parts of the apparatus. Supports 20, 21, or the walls of the upper compartment, support four drawers 28. The drawers are mounted on conventional drawer guides so they can be pulled outwardly when the front door is open. The drawers carry light-tight removable film magazines 22, 23 and 24 for unexposed film and a light-tight magazine 25 for exposed film. The drawers and the magazine thereon are located one above another. The drawers all slide out toward the front of the machine (to the left in FIG. 1) for replacing the magazines, or for refilling supply magazines 22–24 while the magazines remain on the drawers. FIG. 1 shows in phantom the top drawer 28 partially withdrawn from the upper compartment. Each magazine encloses film by front, rear, side, bottom and top walls, the top wall of each having a hinged door, one of which is shown open at 26 on magazine 23. A vertically slideable upright member 27 operates elements (not shown) which engage the doors to open them one at a time according to which magazine is to be used in the operation of the machine, that is, according to which size film is to be fed to the registration station, or if exposed film is to be fed to magazine 25.

The magazines 22–24 can be "conventional" magazines or "roomlight loading" magazines. A conventional magazine is loaded with unexposed film in a darkroom under safelight conditions and is then brought to the printer and placed on one of the drawers, which is in a normally lighted room. A "roomlight loading" magazine accepts film that is contained in a light-tight package and provides means for removing the package from the film while both are inside the closed magazine in a normally lighted room.

The principal convenience to the customer of a roomlight loading magazine is that it is not necessary to use a darkroom, which may not be nearby, when loading film into the printer. Because of limited space in many hospital environments, it may not be convenient for the operator to remove the roomlight loading magazine from the printer and find a suitable surface to place it on to load it with film. The printer of the present invention solves this problem by use of film drawers which hold the film magazines and can be withdrawn from compartment 11 wherein they provide a stable location on the printer itself for roomlight loading of film packages into the machine. Thus, roomlight loading magazines are preferred but conventional magazines also can be used.

Figure 3:
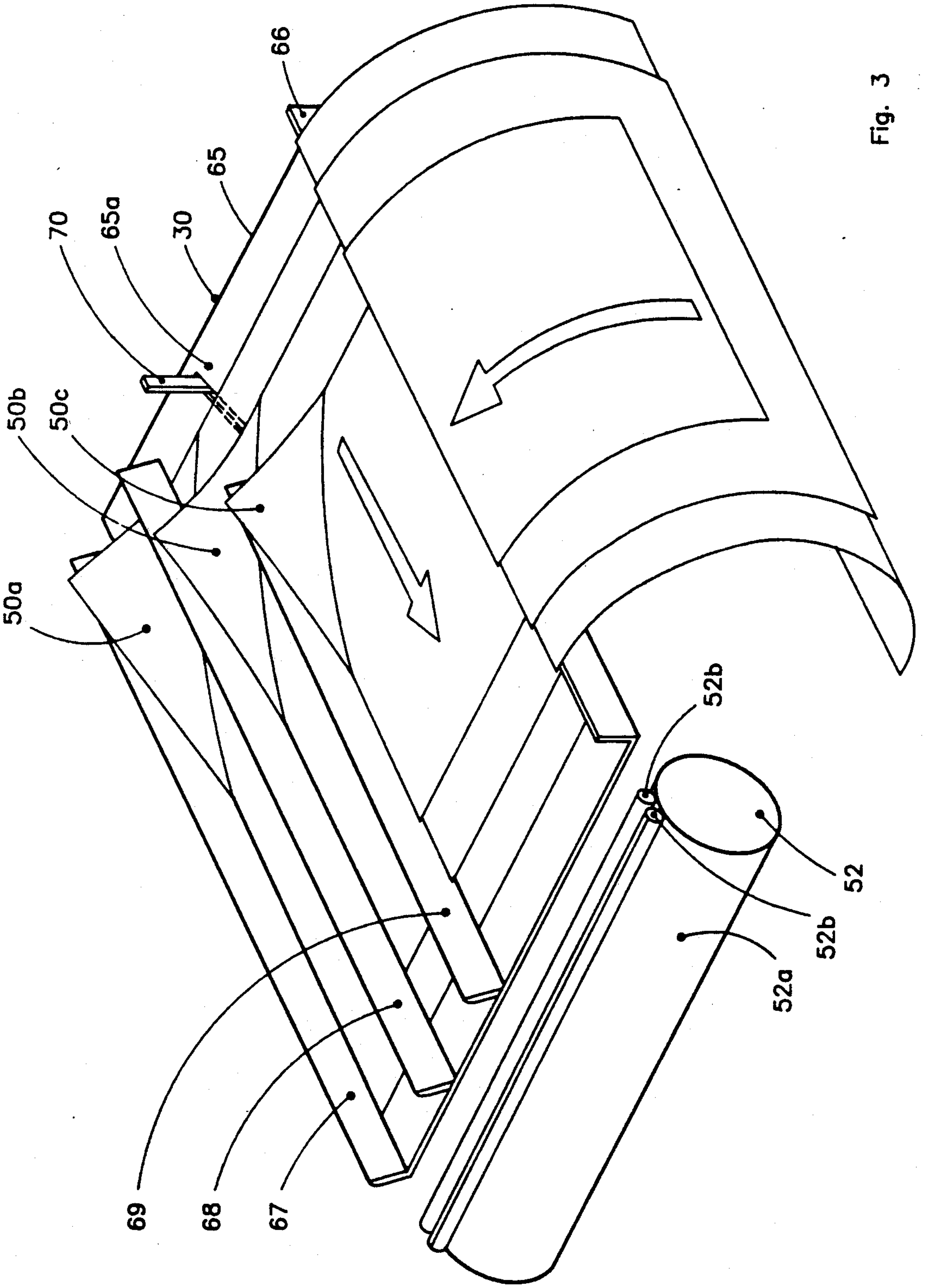
FIG. 3 is a perspective view showing the registration station and scan drum, and indicating how different sized sheets are received by that station.

Over the stack of magazines is a registration station 30 which is better seen in FIG. 3, and which can be of a type disclosed in either of the commonly-owned applications on such apparatus, referred to at the beginning of this specification. Unexposed film is moved from the various magazines by a transport mechanism indicated in FIG. 1 at 31. This mechanism comprises a pair of fixed, vertical guides 32 (only one of which can be seen in FIG. 1) along which a support 32*a* for the film transport mechanism 31 is slideable. A motor 34 carried by support 32*a* moves an arm 35 carrying a suction member 36 which enters a film magazine as shown in the case of magazine 23 in FIG. 1, bends up the edge of a film 37, and moves it into an arcuate device 39 carried by support 32*a*. Details of this portion of the apparatus are disclosed in International Publication WO 88/06749 referred to above.

The arcuate device 39 may be as disclosed in the International Publication or as disclosed in the Sachs et al application referred to above. It comprises two spaced supports mounted to a transverse mounting rail carried by supports 32*a*. These supports consist of wire portions of identical design arranged at a distance from and parallel to each other. They form arcuate parallel channels which are concentric with the shaft of motor 34 and have an entrance opening positionable above the respective magazines 22–24 and the alignment station, and facing them. Arm 35 moves concentrically with respect to the channels. The channels may be simply wire portions or they may carry rollers which engage the film. Sliding support 32*a* is moved up and down (indicated by arrow 32*b*), as necessary, by a motor 40 which operates a chain 41 attached to sliding member 32*a*. By this motor drive and sliding mounting for the transport mechanism 31, a sheet can be removed from any of magazines 22–24 and carried by the arcuate supports 39 up to the registration station indicated at 30.

Also seen schematically in FIG. 1 is the laser device 43, of which only the revolving polygon 44 is seen in this Figure.

Figure 2:
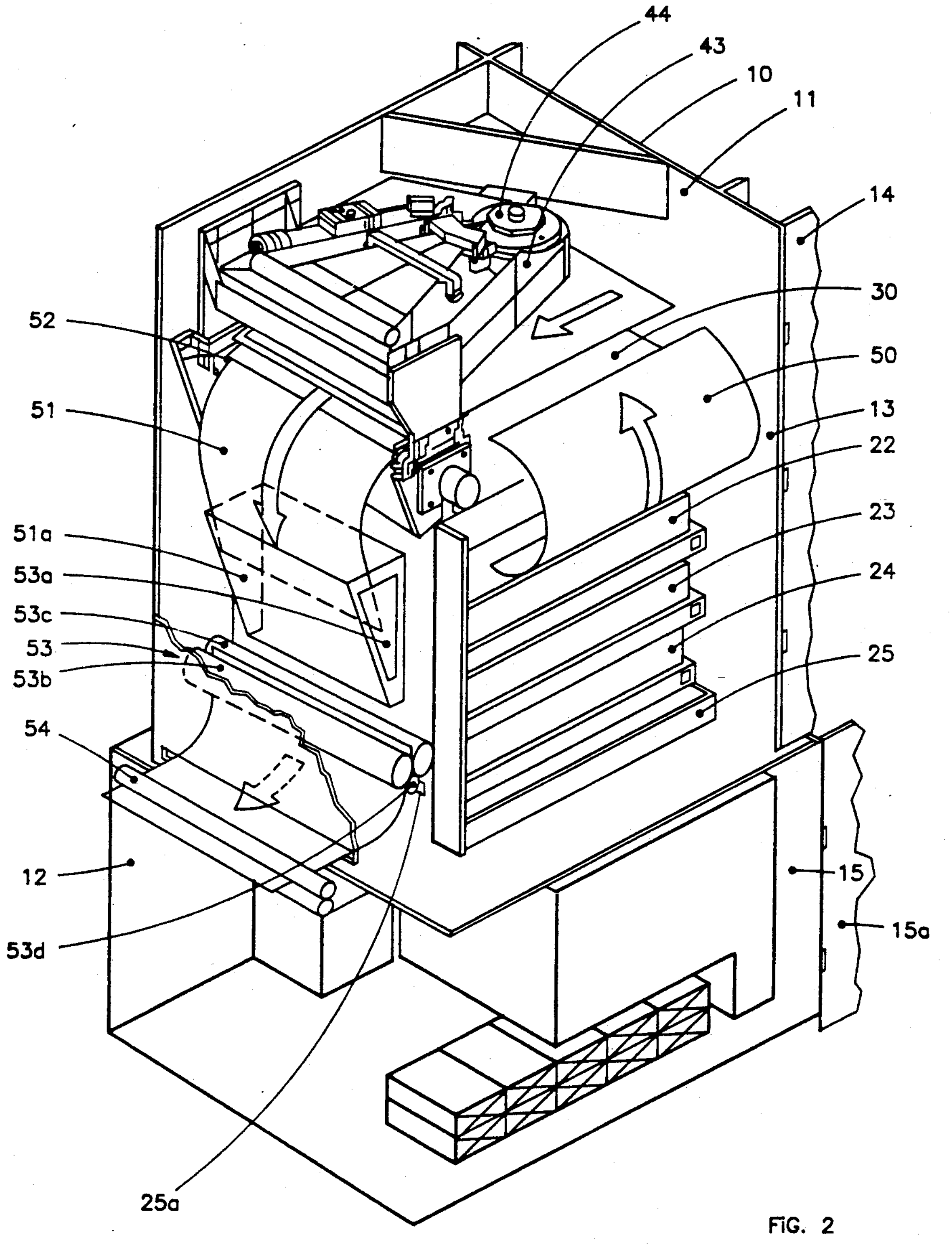
FIG. 2 is a perspective view of the interior of the printer, with the front of the machine facing toward the right, and with the sheet transporting structure omitted for clarity.

In FIG. 2, the front of the machine faces toward the right, and the film transport mechanism has been omitted for clarity. An unexposed sheet of film 50 is shown entering registration station 30 from the front and sheet 51 is shown exiting toward the left from the exposure station indicated generally at 52. Sheet 51 is moving downwardly in a guide chute 51*a* located along the left side wall to a roller arrangement 53 by which an exposed sheet can be selectively directed to storage magazine 25 or to rollers 54 which may be part of a processor (not shown) positioned adjacent the left side of the printer, with a light-tight passage from the printer to the processor. Roller arrangement 53 comprises three rollers. Two of these, 53*b* and *c*, are idlers with their axes parallel and extending in front to rear direction. The two rollers are spaced equidistant from the center line of the chute and cooperate with a parallel driving roller 53*d* which can be rotated either clockwise or counterclockwise by driving means not shown. As viewed in FIG. 2, if driven roller 53*d* rotates clockwise, the exposed film is directed to magazine 25 through slot 25*a*. If it is rotated counterclockwise, the exposed film is directed to the adjacent processor. A door indicated at 53*a* provides access from the front of the printer to the interior of the chute 51*a*.

FIG. 3 shows schematically registration station 30 and an exposure station 52, the latter being over the registration station. A scan drum 52*a*, whose axis of rotation extends in a front-to-rear direction, cooperates with two smaller rollers 52*b* at exposure station 52 to drive a film sheet through the station. Registration station 30, as described in detail in two of the applications referred to above, comprises a member 65 having a flat and generally horizontal upper surface 65*a* and a registration guide 66, the inner surface of which extends vertically upwardly from member 65. Guide 66 may have its upper edge portion sloped slightly toward the front (not shown) to assist in deflecting a newly fed sheet onto surface 65*a*. The inner surface of guide 66 comprises the registration surface for sheets being fed to the left to the scanning station.

At the edge of member 65 opposite registration guide 66 is another upwardly extending guide 67 which is tilted away from the surface of member 65 so that its upper edge is farther from registration guide 66 than its lower edge. Guide 67 is also skewed relative to registration guide 66 so that the end of guide 67 nearest the exposure station 52 is spaced from guide 66 by approximately the width of the widest film sheet to be exposed, while the other end of guide 67 is nearer to guide 66. Two other guides 68 and 69 are shown. They are tilted and skewed like guide 67. A pusher 70 extends upwardly through a slot in member 65, the slot being at an angle to guide 66, so that the pusher can engage each of the three film sizes 50*a*, *b* and *c*. The pusher is operated by power means, not shown.

Figure 4:
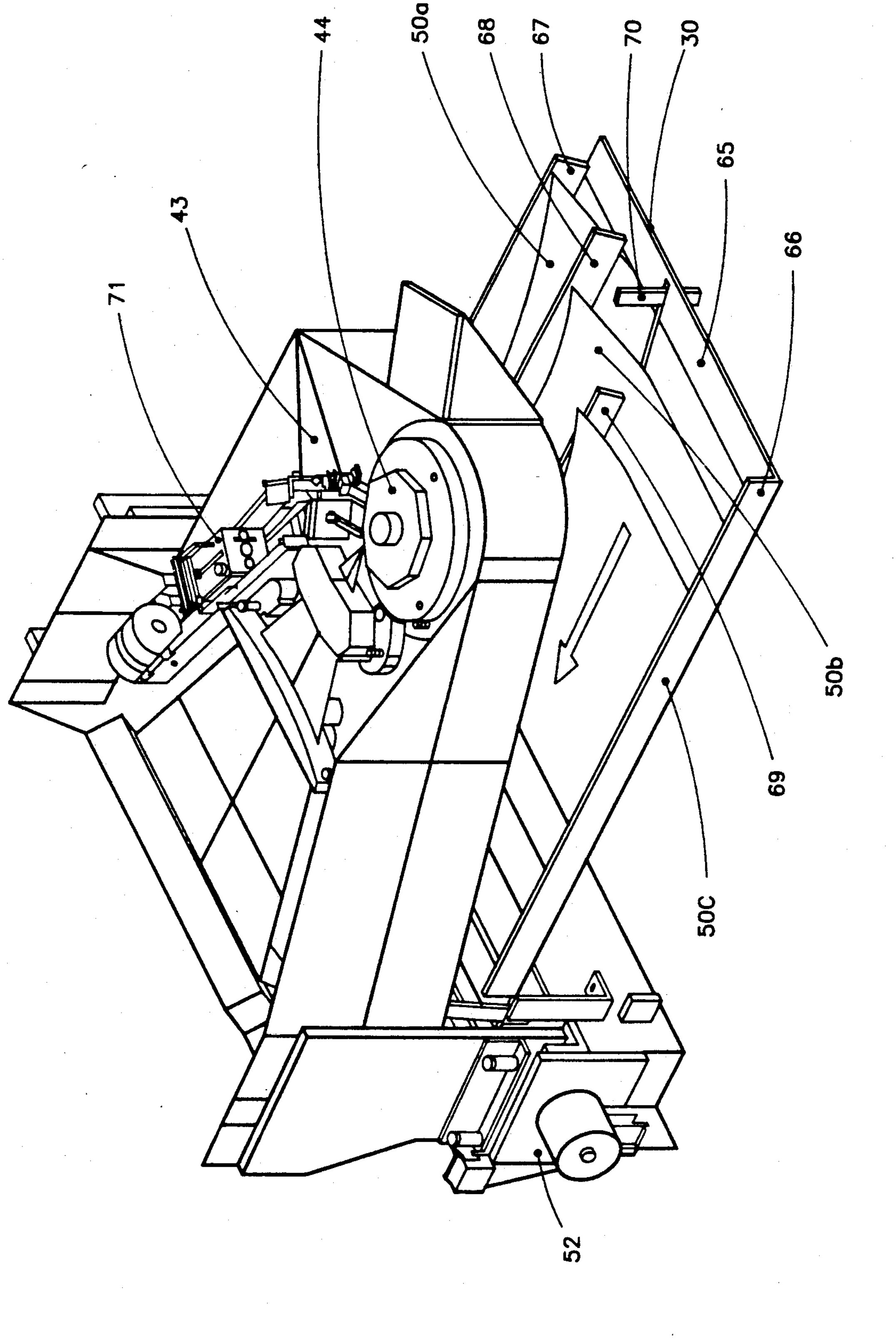
FIG. 4 is a detailed perspective view showing the printer optics and, below the optics, the registration station.

While FIGS. 3 and 4 show three different film sizes being fed at the same time, this is merely to demonstrate the operation of guides 67–69, as in practice, only one size sheet would be fed at a time. As mentioned above, guide 67 operates when the largest size sheet 50*a* is fed. During such operation, guides 68 and 69 are moved out of the way lowering them either through slots (not shown) in member 65, or by pivoting them so that they lie flat in recesses (not shown) in the upper surface of member 65. It should be apparent that when a medium size sheet 50*b* is fed, only guide 69 is moved out of the way, the latter being raised to operating position only when the smallest size sheet 50*c* is fed.

FIG. 4 shows a laser device 71 located over the registration station, feeding modulated light to revolving polygon 44 which through suitable lenses directs the information in a known manner to scanning station 52 shown in FIGS. 2 and 3. Registration station 30 is shown under the laser device, and the three different size sheets are shown in the registration station. A suitable laser device is disclosed in the Noethen application referenced above.

OPERATION

Operating procedure starts with opening of door 14. This is conveniently done automatically by the machine on receiving a signal from the operator. The operator pulls out the drawer with the magazine to be loaded, as shown in phantom in FIG. 1 for the top drawer 28 and magazine 22. Then the operator opens the magazine while it remains in the drawer, removes any packaging material left in the drawer from the previous package of film, inserts a new film package, closes the magazine, pushes in the drawer, and closes the film access door. The machine then actuates a mechanism (not shown) which removes the packaging from the film. Alternatively, the drawer and magazine are withdrawn from the upper compartment and the magazine is replaced with a new magazine that has been loaded in a dark room.

Transport mechanism 31 is moved up or down in front of the drawers by motor 40, as required, to provide access to the magazines. With the magazines loaded and door 14 closed, the apparatus is ready for printing. By means of a control panel, not shown, the operator selects the proper size film to be exposed, whereupon transport mechanism 31 moves to the proper magazine 22–24, the cover of the magazine is opened by sliding upright member 27, and suction member 36 removes a film sheet and feeds it in a rear-to-front direction into the arcuate wire device 39 by movement of arm 35. Motor 40 is then actuated to move the arcuate device and film upwardly until the film is in a position as shown in FIG. 2. Motor 34 then moves arm 35 in a clockwise direction as seen in FIG. 1 to feed the leading edge of the film over the upper front edge of guide 66 onto the upper surface of the registration station.

As seen best in FIG. 3, if the sheet is of the largest size 50*a*, guides 68 and 69 are depressed out of the way. When the trailing edge of the film passes to the left over guide 66, the leading edge will be in the position shown in FIG. 3 due to the skewed position of guide 67, that is, the end of the film farthest from the exposure station slides partly up the tilted surface of guide 67. When pusher 70 is actuated to move the film toward the exposure station, the sloping and skewed orientation of guide 67 causes the trailing edge (with respect to entry into the registration station) of the film to move along guide 66, which is the proper alignment, and this alignment continues until the sheet has left the alignment station.

Film passes from the registration station into exposure station 52, which is a slow scan mechanism in which the film moves with a rotating drum 52*a* and is held to the drum by a pair of smaller rollers 52*b*. As the film is moved slowly by the drum, a modulated laser beam is scanned between the smaller rollers by laser device 43 to record lines of information. As the exposure progresses to completion, the film moves downwardly along the left side wall of the upper compartment from the exposure station into the vertical chute 51*a* and then to roller arrangement 53 which directs it either to storage magazine 25, or to an adjacent processor, under the direction of the operator.

The invention is particularly useful for accepting an electronic image from a medical scanner and printing the image on film. The unique arrangement of parts contributes to compactness and provides extreme ease of servicing. All of the parts in the upper, light-tight compartment 11 are readily accessible from the front of the apparatus by opening door 14. Magazines 22–25 are thus easily accessible as is the transport mechanism. Also, the door 53*a* into the chute 51*a* can be opened from the front to clean the chute and the area of the three roller arrangement 53. Thus, in case of unlikely film jams, all locations are readily accessible from the front of the apparatus. All parts in the upper compartment are at a convenient height. As noted before, the magazines 22–24 can be loaded with film or replaced, and magazine 25 can be replaced, while the door is open and the drawers extended outwardly.

The electronics in the lower compartment can be serviced without disturbing the light-tightness of the upper compartment. Less frequently serviced components, such as the transformer and power supplies are at the rear of the lower compartment, while more frequently serviced components are located toward the front of this compartment. Placing the electrical components in the lower compartment facilitates exhausting heat from that compartment without influencing the mechanical components, and permits proper shielding of the upper compartment from electromagnetic interference. The lower compartment need not be light-tight, hence its construction is simplified. Locating the electronic components on a pull-out drawer also simplifies servicing.

The invention has been described in detail with particular reference to certain preferred embodiments thereof, but it will be understood that variations and modifications can be effected within the spirit and scope of the invention.

I claim:

1. An easily serviced laser printer having compactness attributes, comprising:

a light tight compartment formed by a rear wall, and left and right side walls extending forwardly from said rear wall toward the front of the printer, and a front closure door providing access to the interior of the compartment from the front, said compartment containing:

a sheet registration station, a sheet exposure station located toward a first side wall from said registration station, means for moving a sheet toward said first side wall from said registration station to said exposure station, a laser optical station over said registration station for directing a modulated laser beam to said exposure station, means located under said registration station for storing a supply of light sensitive sheets, said storing means being accessible from the front of the printer for sheet loading into said storing means in a front-to-rear direction, and means located in front of said storing means and moveable up and down in front of said storing means for receiving a sheet from said storing means by movement of the sheet in a rear-to-front direction, then moving said sheet upwardly to said registration station to feed the sheet in a front-to-rear direction into the front of said registration station, and then moving back down to said storing means to receive another sheet.

2. A laser printer as set forth in claim 1, further comprising:

said exposure station being positioned to feed an exposed sheet downwardly in said compartment along said first side wall.

3. A laser printer as set forth in claim 2, further comprising:

means forming a chute located along said first side wall to receive said downwardly fed exposed sheet, said chute having a door providing access to the interior of the chute from the front.

4. A laser printer as set forth in claim 3, further comprising:

means at the lower end of said chute for directing an exposed sheet selectively to storage in said compartment or to the exterior of the compartment.

5. An easily serviced laser printer having compactness attributes, comprising:

wall means enclosing upper and lower compartments, said wall means comprising, for the respective compartments, a rear wall at the rear of the printer, left and right side walls extending forwardly from said rear wall toward the front of the printer, and a door at the front moveable between open and closed positions, said lower compartment containing electronic devices for operating the printer, said electronic devices generating electronic emissions and heat when operating, said wall means including means to insulate said upper compartment from said electronic emissions, and means for removing heat from said lower compartment, said upper compartment containing a plurality of components, comprising:

(a) storage means for unexposed sheet film, said storage means comprising a plurality of stacked magazine drawers that are slideable toward the front for receiving loads of sheet film in a front-to-rear direction from the front of the printer, (b) a sheet film registration station located over said drawers when the latter are in position for the feeding of sheets therefrom, (c) an exposure station located to one side of said registration station in the direction of a first of said side walls, said exposure station comprising a rotating drum whose axis of rotation extends in a front-to-rear direction so as to direct exposed sheets downwardly along said first side wall, (d) means for advancing a sheet from said registration station to said exposure station, (e) a laser optical system located over said registration station for forming an image at said exposure station, and (f) means for moving a sheet from a drawer of said storage means to said registration station, said moving means being moveable up and down in front of said drawers and having means for moving a sheet in a rear-to-front direction from a drawer and delivering the sheet in a front-to-rear direction into the front of said registration station, said door of the upper compartment rendering the compartment light-tight when closed, and when open, providing access to the components in the upper compartment for service and loading of film sheets into said drawers in a front-to-rear direction, said upper and lower compartment doors being operable independently of each other.

6. A laser printer as set forth in claim 5, further comprising:

means forming chute positioned along said first side wall of the upper compartment below said exposure station for receiving exposed film from said station, and means below said chute for receiving an exposed film sheet therefrom and directing it, selectively, to storage within said upper compartment or to other apparatus for further treatment.

7. A laser printer as set forth in claim 6, further comprising:

an exposed sheet storage magazine supported by a drawer in said upper compartment, the exposed sheet storage magazine being under said unexposed sheet storage drawers.

* * * * *